United States Patent
Ko

(10) Patent No.: US 7,983,954 B2
(45) Date of Patent: Jul. 19, 2011

(54) AUCTION METHOD FOR REAL-TIME DISPLAYING BID RANKING

(76) Inventor: Sung Min Ko, Koyang (KR)

(*) Notice: Subject to any disclaimer, the term of this patent is extended or adjusted under 35 U.S.C. 154(b) by 0 days.

(21) Appl. No.: 12/946,298

(22) Filed: Nov. 15, 2010

(65) Prior Publication Data

US 2011/0060656 A1    Mar. 10, 2011

Related U.S. Application Data

(63) Continuation of application No. 10/502,553, filed on Jan. 20, 2005, now Pat. No. 7,835,944.

(30) Foreign Application Priority Data

Jan. 24, 2002 (KR) .......................... 10-2002-004314
Jan. 24, 2003 (WO) ...................... PCT/KR03/00157

(51) Int. Cl.
  *G06Q 30/00* (2006.01)
(52) U.S. Cl. ........................................................ 705/26
(58) Field of Classification Search .................... 705/26, 705/27

See application file for complete search history.

(56) References Cited

U.S. PATENT DOCUMENTS

2002/0169705 A1* 11/2002 Gutierrez et al. ............... 705/37
2004/0039677 A1*  2/2004 Mura et al. ..................... 705/37

OTHER PUBLICATIONS

M2 Presswire. Coventry: Jun. 8, 2000. p. 1 http://proquest.umi.com/pqdweb?did=54928387&sid=2&Fmt=3&clientId=19649&RQT=309&VName=PQD.*

* cited by examiner

*Primary Examiner* — Mila Airapetian
(74) *Attorney, Agent, or Firm* — Dean A. Craine

(57) ABSTRACT

Disclosed herein is a real-time auction method that is based on an auction server for performing a process of an auction and wired and wireless terminals of participants. The method includes the auction screen providing step of providing an auction screen, on which auction information is displayed, to wired and wireless terminals of participants participating in the auction, the ranking displaying step of displaying bidding prices on the auction screen in order of ranking in the case where the participants present the bidding prices, the bidding extending step of extending a bidding time if a highest bidding price is lower than a predetermined desired bidding price or a difference between a highest bidding price and a next highest bidding price is less than a predetermined difference when a first set bidding time ends, and allowing only bidders presenting the highest bidding price and the next highest bidding price to participate in the extended auction, and the successful bid determining step of displaying a successful bidding price and a successful bidder when a finally set bidding time ends.

1 Claim, 8 Drawing Sheets

AUCTION METHOD FOR REAL-TIME DISPLAYING BID RANKING

BACKGROUND OF THE INVENTION

This application is a continuation application based on the U.S. patent application Ser. No. 10/502,553 filed on Jan. 20, 2005 which was based on PCT application (PCT Application No. PCT/KR03/00157) filed Jan. 24, 2003, which is based on and claims the prior date of Korean patent application (Application No. 10-2002-004314) filed on Jan. 24, 2002.

1. Field of the Invention

The present invention relates to a real-time auction method, which publicizes an auction through terrestrial broadcasting, thus increasing the number of participants and effectively performing the auction. In addition, the present invention relates to a real-time auction method, in which an auction screen is constructed in a graphic form, bidding rankings are displayed in real time, and additional services, such as advertisement and chatting services, are provided, thus increasing the interest of the participants in the auction and therefore promoting continuous participation in the auction.

2. Description of the Related Art

In the past, various auction methods, such as normal auction methods, reverse auction methods, network auction methods and a real-time auction method (see Korean Pat. Appl. Unexamined Publication No. 2000-23932), were disclosed.

In the conventional auction methods, participation in an auction is performed using characters, such as text, and buttons, so the participation in an auction is tedious and it is difficult for persons unskilled with computers to participate in auctions even though they desire to participate in the auctions. Additionally, even the new generation accustomed to text-oriented auctions using keyboards is bored with text-oriented auction methods, so they do not continuously participate in auctions and only temporarily access auction sites, thus failing to continuously use the auction sites.

In addition, if persons participate in auctions, they should frequently access auction sites and apprehend the status of the auctions during the processes of the auctions, and the processes of the auctions, in which only the status of bids is changed, cannot attract the interests of participants, so the participants feel bored when accessing the auction sites.

Meanwhile, in conventional auction methods, persons, who desire to purchase particular products, should search for the products in person. Currently, on the Internet, a push technique in which advertisement is performed or tailor-made information is provided through e-mail, is widely employed. However, the conventional auction methods run counter to the current push technique on the Internet. In the case where persons desire to participate in auctions, they should participate in auction sites and search the contents of auctions one by one, which is tiresome. The conventional methods do not provide user-oriented services, so it is required to provide greater convenience to users.

For this reason, the conventional auction methods are disadvantageous in that the continuous access of members to auction sites cannot be promoted because the members do not access the auction sites in the case where there is no product to purchase.

SUMMARY OF THE INVENTION

Accordingly, the present invention has been made keeping in mind the above problems occurring in the prior art, and an object of the present invention is to provide a real-time auction method, which allows the bidding information and bidding rankings of bidders to be recognized in real time.

Another object of the present invention is to provide a real-time auction method, which displays auction information and auction participation means in a graphic form, so any person can easily and conveniently participate in an auction, and the continuous participation of netizens is promoted by inducing interests in netizens and reducing the boredom of participants, thereby allowing an auction company to make profits.

Still another object of the present invention is to provide a real-time auction method, which provides push-type auction information through terrestrial broadcasting, thereby promoting the participation of netizens and allowing the status of an auction to be provided in real time.

In order to accomplish the above object, the present invention provides 1. A real-time auction method displaying bidding rankings in real time, the auction method being based on an auction server for performing a process of an auction and wired and wireless terminals of participants participating in the auction, comprising the auction screen providing step of providing an auction screen, on which auction information is displayed, to wired and wireless terminals of participants participating in the auction; the ranking displaying step of displaying bidding prices on the auction screen in order of ranking in the case where the participants present the bidding prices; the bidding extending step of extending a bidding time if a highest bidding price is lower than a predetermined desired bidding price or a difference between a highest bidding price and a next highest bidding price is less than a predetermined difference when a first set bidding time ends, and allowing only bidders presenting the highest bidding price and the next highest bidding price to participate in the extended auction; and the successful bid determining step of displaying a successful bidding price and a successful bidder when a finally set bidding time ends.

Preferably, the auction screen providing step may be performed in such a way that a plurality of price buttons are provided in the auction screen and the participants input bidding prices by selecting price buttons.

Preferably, the auction screen providing step may be the step of providing the auction screen that includes a chat window for allowing the participants to chat with each other and an advertisement window for displaying motion pictures and advertisements of the product to be auctioned.

Preferably, the real-time auction method further comprises the steps of requesting the participants to pay participation fees at the time of participating in the auction; and permitting the participants to participate in the auction when the participants pay the participation fees.

Preferably, the successful bidder determined at the successful bid determining step may be allowed to pay at least part of the successful bidding price with previously accumulated points.

In addition, the present invention provides a real-time auction method displaying bidding rankings in real time, comprising the auction information providing step of providing auction information including at least one of an auction product, an auction time, an auction start price, a desired bidding price and a motion picture of the auction product through a terrestrial broadcasting; the auction screen providing step of providing an auction screen, on which auction information is displayed, to wired and wireless terminals of participants participating in the auction; the ranking displaying step of displaying bidding prices on the auction screen in order of ranking in the case where the participants present the bidding prices; the bidding extending step of extending a bidding time if a highest bidding price is lower than a predetermined desired bidding price or a difference between a highest bidding price and a next highest bidding price is less than a predetermined difference when a first set bidding time ends, and allowing only bidders presenting the highest bidding price and the next highest bidding price to participate in the extended auction; and the successful bid determining step of displaying a successful bidding price and a successful bidder when a finally set bidding time ends.

Preferably, information about at least one of the ranking displaying step, the bidding extending step and the successful bid determining step may be broadcast through the terrestrial broadcasting.

Preferably, the auction screen providing step may be performed in such a way that an advertisement window is provided to display the motion picture of the auction product or an advertisement before a start of the auction at the auction screen providing step and before a start of the extended bidding at the bidding extending step.

In addition, the present invention provides a real-time auction method displaying bidding rankings in real time, comprising the auction information providing step of providing auction information, including one or more of an auction product, an auction time, an auction start price, a desired bidding price, and a motion picture of the auction product, through terrestrial broadcasting; the ranking displaying step of providing rankings of bidding prices through one or more of terrestrial broadcasting, an Internet site, and wired and wireless terminals, or through an Automatic Response System (ARS) in a voice form when the participants make bids; and the successful bid determining step of providing a successful bidding price and a successful bidder through one or more of terrestrial broadcasting, an Internet site, and wired and wireless terminals, or through an ARS in a voice form when a finally set bidding time ends.

Preferably, the real-time auction method may further comprise the bidding extending step of extending a bidding time if a highest bidding price is lower than a predetermined desired bidding price or a difference between a highest bidding price and a next highest bidding price is less than a predetermined difference when a first set bidding time ends, and allowing only bidders presenting the highest bidding price and the next highest bidding price to participate in the extended auction.

Preferably, the real-time auction method may further comprise the compared prices displaying step of providing selling prices, at which the product to be auctioned is sold at shopping malls or off-line, through one or more of terrestrial broadcasting, an Internet site, and wired and wireless terminals, or through an ARS in a voice form.

DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENT(S)

Embodiments of the present invention will be described with reference to the attached drawings below. These embodiments are disclosed for illustrative purposes, and the present invention is not limited to these embodiments.

A real-time auction system according to the present invention provides auction information to the public via terrestrial broadcasting, and offers a user-friendly environment at the time of auction.

Figure 1:
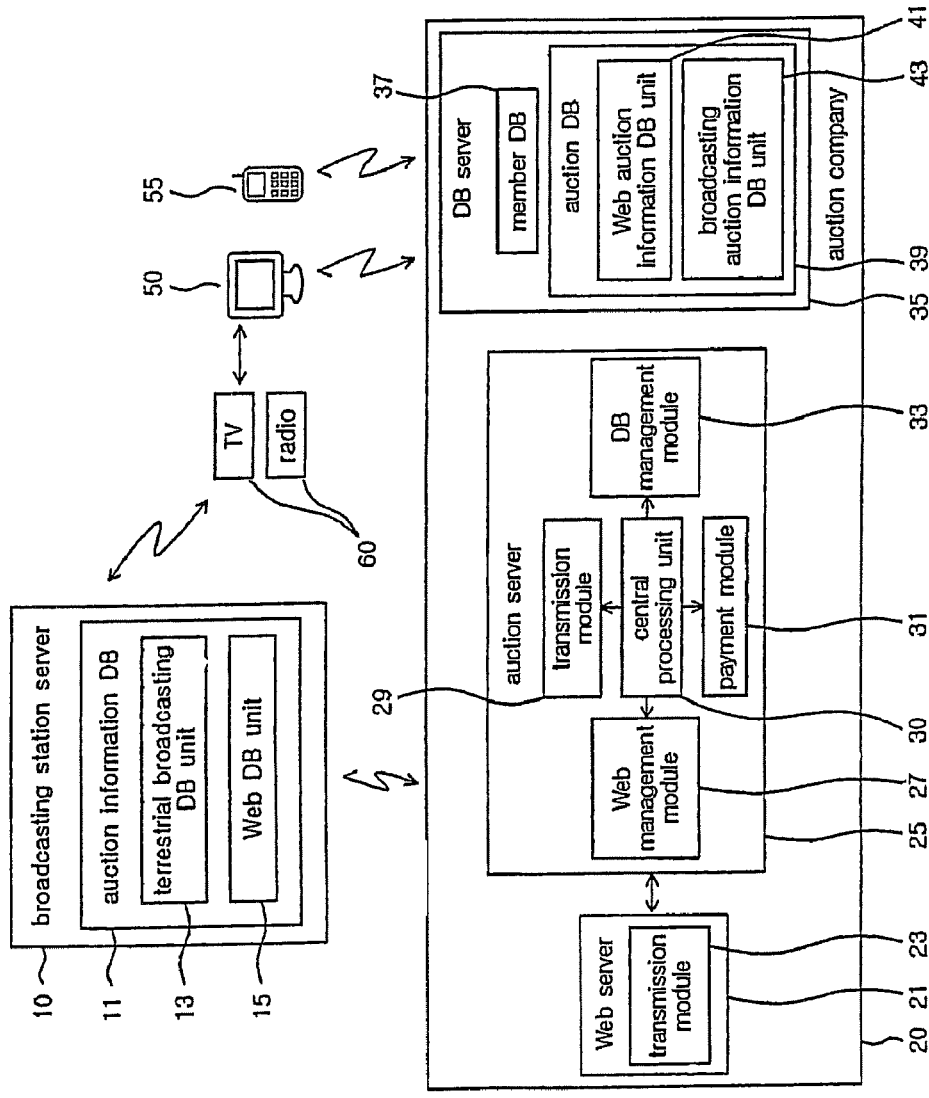
FIG. 1 is a view showing the construction of an auction system for implementing a real-time auction method according to the present invention.

The auction system, as illustrated in FIG. 1, is constructed based on an auction company 20 that manages an auction site and takes charge of the process of an auction, a terrestrial broadcasting station that is provided with auction information by the auction company 20 and provides the auction information to the public via terrestrial broadcasting, and wired and wireless terminals of participants who will participate in the auction.

Generally, terrestrial broadcasting refers to one of television and radio broadcasting. In the present invention, terrestrial broadcasting generally refers to all broadcasting that can provide information to the public in any of wired and wireless manners. The terrestrial broadcasting station gets a server ready for services, provides broadcasting information via the Internet, and provides information provided by the auction company via terrestrial broadcasting and the Internet to the public. For this purpose, a terrestrial broadcasting station server 10 is provided with an auction information DataBase (DB) 11 in which auction information provided by the auction company 20 is stored. The auction information DB 11 is divided into a Web DB unit 15 and a terrestrial DB unit 13 depending upon the form of data stored therein. Auction information in the form of data that can be provided in the form of Web pages that are managed by the terrestrial broadcasting station, while auction information in the form of data that can be provided via terrestrial broadcasting is stored in the terrestrial DB section 13.

The terrestrial broadcasting station provides auction information, which is provided by the auction company 20 and stored in the auction information DB 11, to the public via terrestrial broadcasting. In this case, the terrestrial broadcasting station provides auction information to netizens, who access a Web site managed by and associated with the terrestrial broadcasting station, by posting the auction information about the Web site besides broadcasting the auction information via terrestrial broadcasting media, such as televisions and radios 60. The auction information provided via the terrestrial broadcasting includes the motion picture of a product to be auctioned, the starting date of an auction, the closing date of the auction, the starting price of the auction, a desired successful bidding price and various information that can invite participation in the auction, such as opinions on the product to be auctioned.

The auction company 20 providing auction information to the terrestrial broadcasting station includes a Web server 21 that manages the auction site, a DB server 35 that stores various auction-related information, and an auction server 25 that manages the auction and takes charge of the management of information input and output between the Web server 21 and the DB server 35.

The Web server 21 includes a transmission module 23 used to transmit the auction information to a wired terminal 50, a wireless terminal 55 and a Web site of the terrestrial broadcasting station in the form of Web data, and posts various information provided by the auction server 25 and the DB server 35 on the auction site. That is, the Web server 21 displays information retrieved from the DB server 35 and provided by the auction server 25 on an appropriate page, for example, an auction screen, a bidder ranking window, a motion picture and advertisement window on which the motion picture of a product and a general advertisement is displayed, a chatting window, etc. At this time, the Web server 21 carries out an adjustment to display the information at an appropriate position on a Web page to be of appropriate size.

The DB server 35 in which various information including the auction information provided via the terrestrial broadcasting and the Web site includes a member DB 37 that manages personal information of member netizens and history information about participation in auctions and an auction DB (39) in which information of products to be auctioned is stored. The auction DB 39 includes a Web auction information DB unit 41 in which auction information provided to the Web site is stored and a broadcasting auction information DB unit 43 in which auction information provided to the terrestrial broadcasting station is stored.

In this case, the personal information stored in the member DB 37 includes names, IDs, passwords, addresses, social security numbers, the number of times of access, and accumulated points, and the history information stored in the member DB 37 are overall information produced during auctions, including information about the numbers of times of participation in auctions, products that members desired to buy at auctions, successful bids, the cancellation of bids and credits based on participation in auctions.

Further, in the auction DB 39 are stored auction information about a product to be auctioned, an auction time, an auction start price, a desired successful bidding price, an auction method, auction rules, etc. The auction information is formed in the form of data that can be displayed on a Web site and broadcast trough terrestrial broadcasting, and stored in the Web auction information DB unit 41 and the broadcasting auction information DB unit 43, respectively. Information about bidding particulars, a successful bid, extended bidding and bidder information, which is generated in the process of the auction, is stored in the auction DB 39 in the form of the above-described data.

The auction server 35 that manages the DB server 35 and the Web server 21 includes a central processing unit 30 that controls input from and output to the DB server 35 and the Web server 21, a transmission module 29 that transmits input and output information to the outside, a DB management module 33 that manages information stored in the DB server 35, and a Web management module 27 that inputs and outputs information stored in the Web server 21. Additionally, the auction server 25 further includes a payment module 31 that carries out payment-related operations, such as the calculation of auction participation fees, successful bidding prices, service fees and member bonus points, and the conversion of member bonus points, and stores operation results in the member DB 37 and the auction DB 39.

In the meantime, the central processing unit 30 compares a highest bidding price with a predetermined desired bidding price and a difference between a highest bidding price and a next highest bidding price with a predetermined difference, and extends the auction time or re-performs an auction if the highest bidding price is lower than the predetermined desired bidding price or the difference between the highest bidding price and the next highest bidding price is less than the predetermined difference. In the case where the highest bidding price is lower than the predetermined desired bidding price, the auction time is preferably extended. In contrast, in the case where the difference between the highest bidding price and the next highest bidding price is less than the predetermined difference, the auction is re-performed on condition that only a candidate successful bidder and a next ranking bidder participate in the re-performed auction.

Meanwhile, the DB management module 33 manages the member DB 37 and the auction DB 39. The DB management module 33 and the other modules each receives information from and sends information to the DBs of the DB servers 35. Of the information retrieved from the DBs, auction information that has the form of terrestrial broadcasting data to be represented through terrestrial broadcast is offered to the terrestrial broadcasting station through the transmission module 29. Such auction information in the form of terrestrial broadcasting data may be transmitted to the terrestrial broadcasting station using the transmission module 23 of the Web server 21 rather than the transmission module of the auction server 25, along with auction information in the form of Web data.

In order to perform an auction using the auction system, the auction is publicized by providing auction information through terrestrial broadcast and the Internet.

In order to publicize the auction, the auction company 20 stores auction information produced in the form of Web data to be represented through the Web site and auction information produced in the form of terrestrial broadcasting data to be represented through the terrestrial broadcasting in the auction DB 39.

Figure 2:
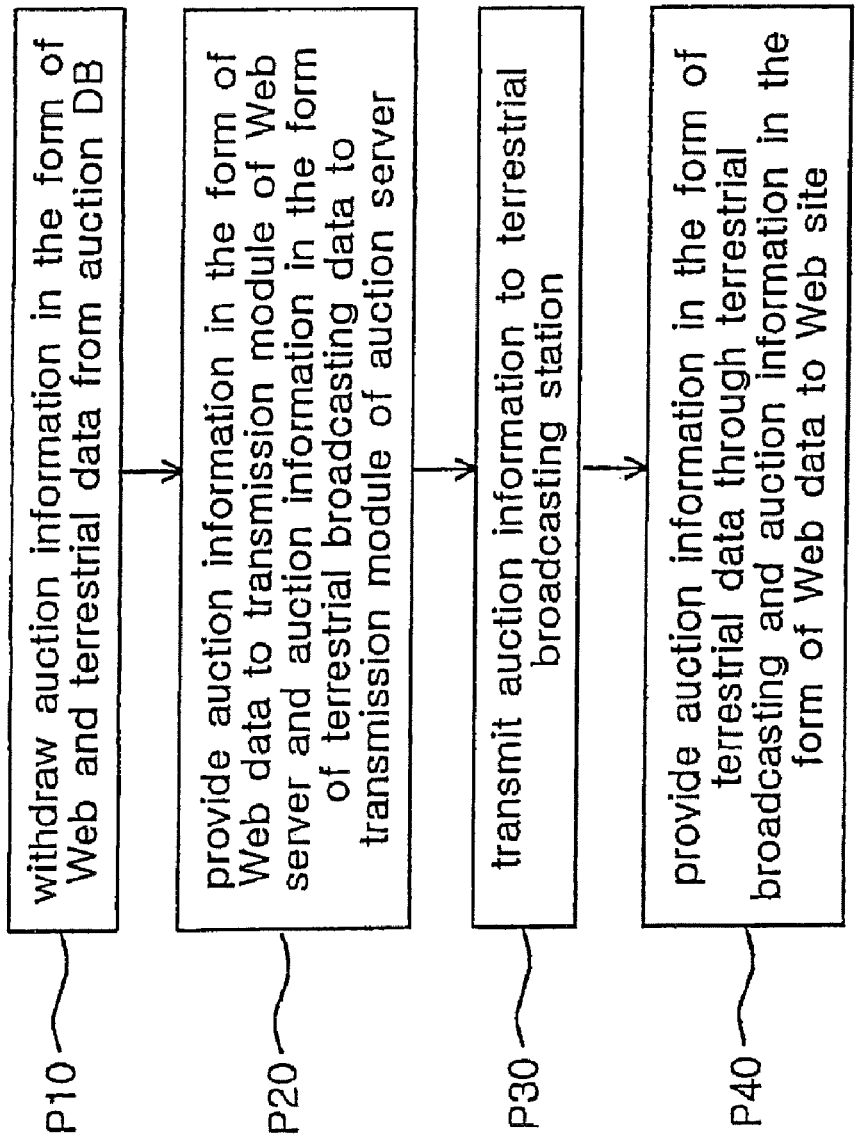
FIG. 2 is a flowchart showing a process of publicizing an auction prior to a process of an auction.

Once the auction information has been stored, the central processing unit 30 of the auction server 25, as shown in FIG. 2, withdraws auction information stored in the form of Web and terrestrial data and related to a product to be publicized from the auction DB 39 at step P10. This withdrawn auction information is provided to the transmission modules 23 and 29 of the Web server 21 and the auction server 25 at step P20. The transmission modules 23 and 29 of the Web server 21 and the auction server 25 transmit the withdrawn auction information in the form of terrestrial broadcasting data and the withdrawn auction information in the form of Web data to the terrestrial broadcasting station server 10 at step P30, respectively. Of the transmitted auction data, the transmitted auction data in the form of terrestrial broadcasting data is broadcast through television broadcasting, radio broadcasting or cable broadcasting, whereas the transmitted auction data in the form of Web data is displayed on the Web site of the broadcasting station at step P40.

When the auction information is publicized through the terrestrial broadcasting station as described above, many persons become interested in the auction, and persons who plan to purchase products identical with the product to be auctioned are induced to participate in the auction. That is, as the auction information is provided through the terrestrial broadcasting, persons participating in the auction are increased and the process of the auction is smoothly performed.

Figure 3:
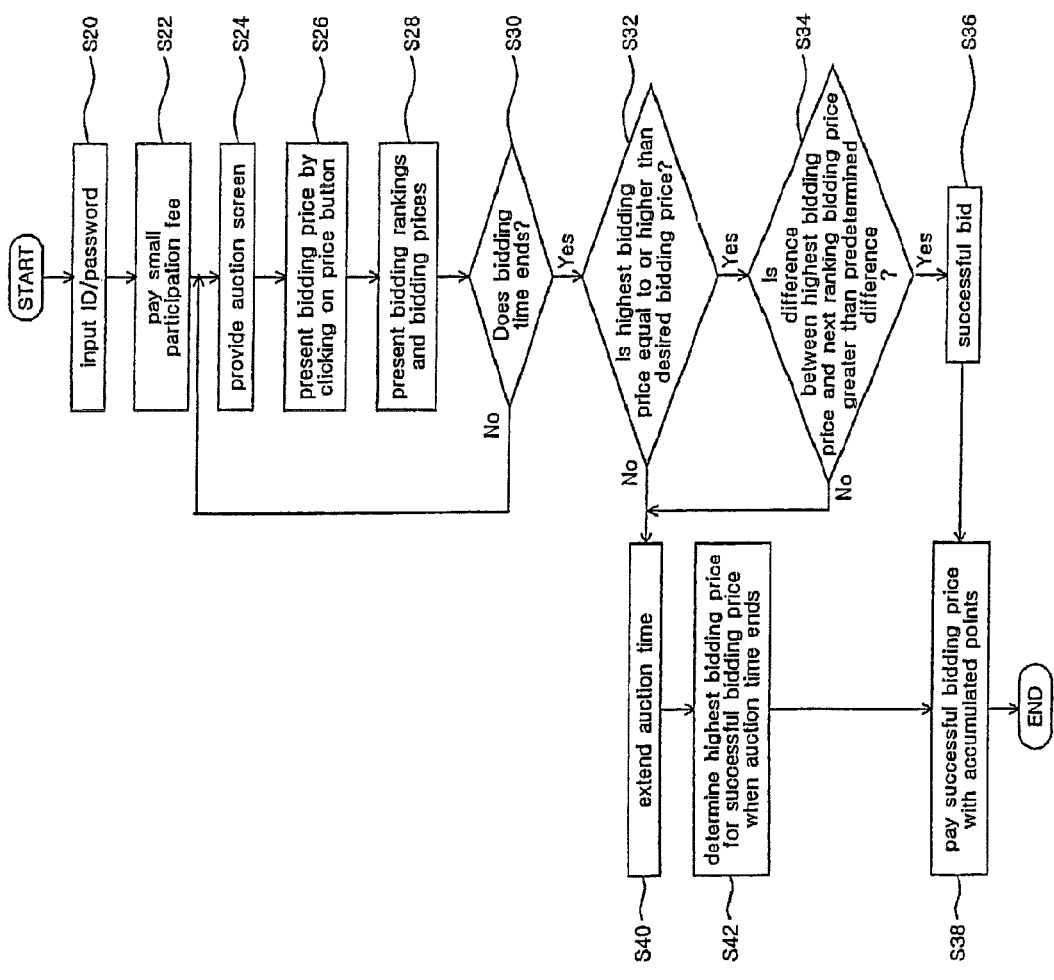
FIG. 3 is a flowchart showing the process of the auction using the auction method of FIG. 1.

Prior to the process of the auction to be performed after the publicizing of the auction, persons desiring to participate in the auction must register as a member. In the case of members, they log in to the auction server 25 by entering their Identifications (IDs) and passwords at step S20, as shown in FIG. 3. In this case, the payment of a participation fee is required for participation in the auction, or free participation in the auction is allowed, at step S22. The Web server 21, as shown in FIGS. 4 and 5, provides auction screens 100 to wired terminals 50 and wireless terminals 55, so members participate in the auction at step S24.

Figure 4:
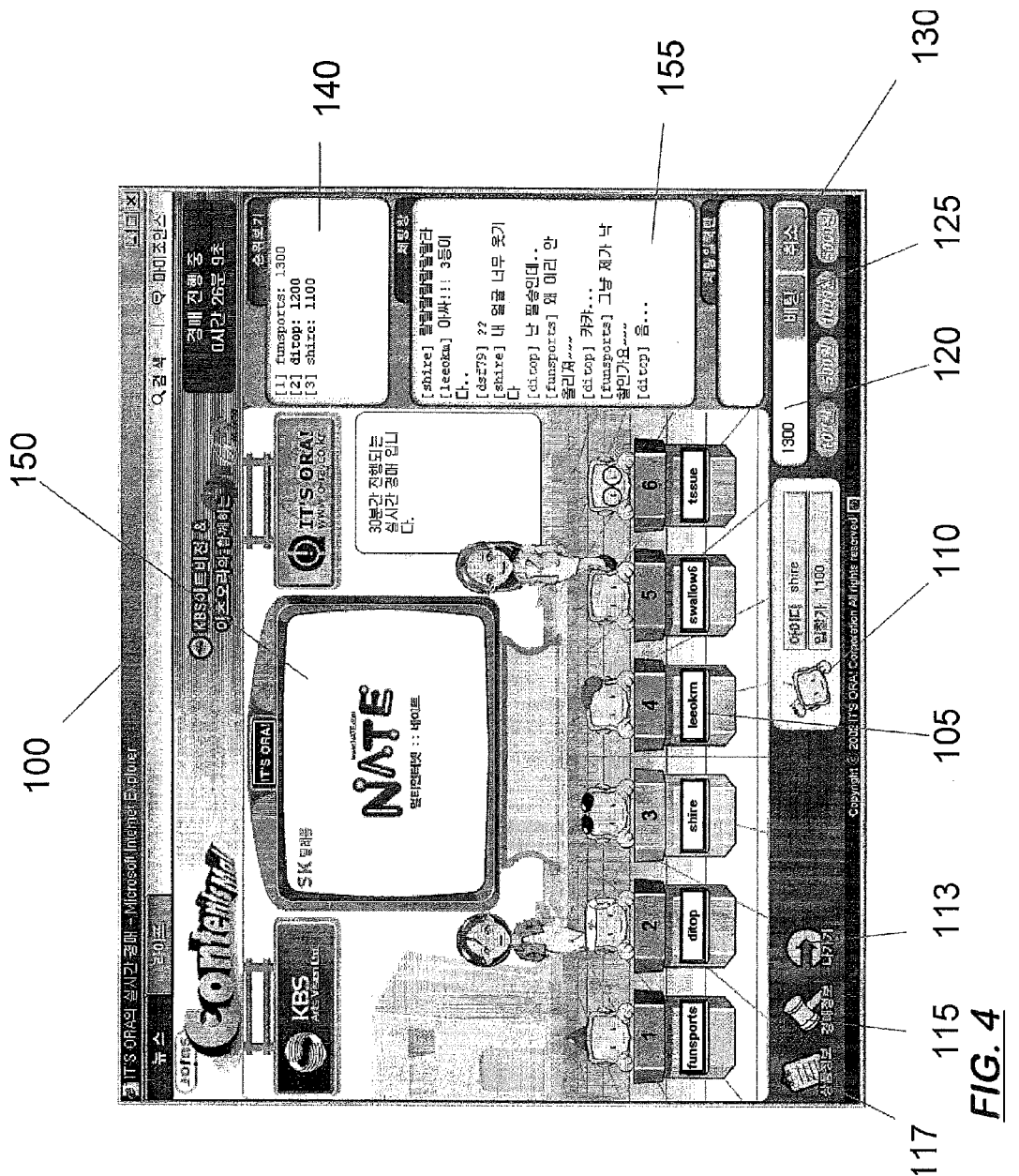
FIGS. 4 and 5 are views of auction screens provided through a wired terminal.
Figure 5:
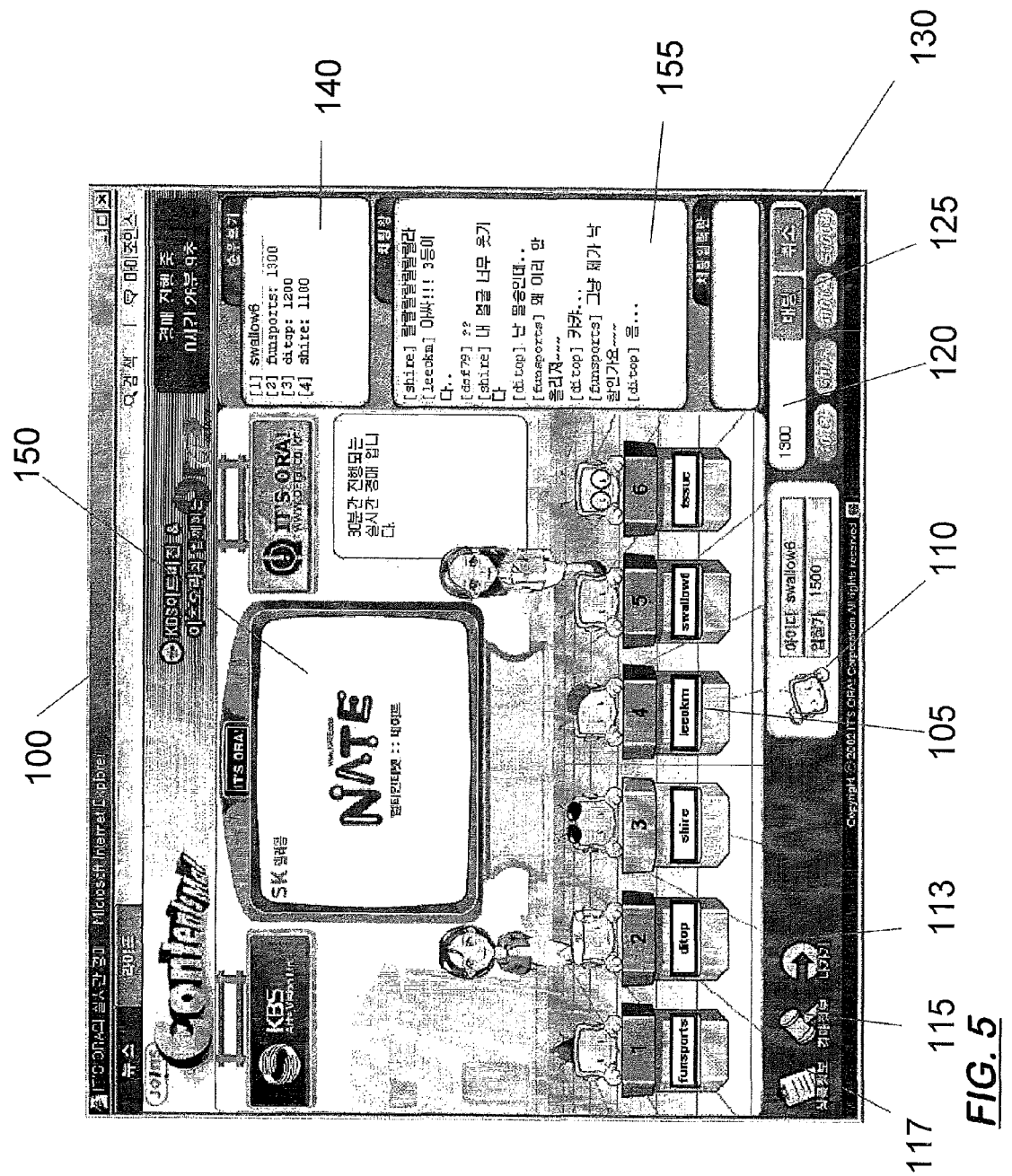

An auction screen 100 for a wired terminal 50 illustrated in FIG. 4 is provided with a betting button 125 that is used to select betting, a predetermined price window 120 that displays a predetermined price, a plurality of price buttons 130 that are used to adjust a bidding price at the time of betting, and a ranking window 140 that displays IDs of bidders, bidding prices and bidding ranks. The auction screen 100 is further provided with a member window 110 that displays his own ID and bidding price, a product information icon 117 that allows a user to ascertain product information, an auction information icon 115 that allows a user to ascertain auction information and an exit icon 113 that ends participation in the auction.

Accordingly, when a member participating in the auction makes a bid, he adjusts a bidding price using the price buttons 130, and selects betting by clicking on the betting button 125 if a desired bedding price is displayed in the at step S26. The auction screen 100 is constructed in the form of a studio, and provided with a plurality of tables 105 with avatars, characterizing a plurality of bidders, arranged thereon in order of ranking, so the process of the auction can be vividly represented to maintain the interest of participants.

Meanwhile, the auction screen 100 is provided with an advertisement window 150, and image information related to a product to be auctioned and broadcasting images are provided through the advertisement window 150. In addition, motion picture advertisements, which target participants waiting to participate in the auction before the process of the auction, are displayed, and a chat window 155 is formed at part of the advertisement window 150 to allow participants to chat with each other. Accordingly, the tedium of participants waiting for participation in the auction can be eliminated, and advertisement can be effectively performed.

While bidders are participate in bidding, the rankings of the bidders are displayed on the ranking window 140 at step S28, so the bidders can easily analyze their own bidding prices and the other participants' bidding prices and present their new bidding prices.

That is, in the auction screen 100 of FIG. 4, the rankings of bidders are displayed; bidder "funsports" bids 1,300 Korean won and takes a first ranking, bidder "ditop" bids 1,200 Korean won and takes a second ranking, and bidder "shire" bids 1,100 Korean won and takes a third ranking. If bidder "swallow6" bids 1,500 Korean won when the process of the auction is further performed, he takes a first ranking. That is, it is apparent from FIG. 5 that bidder "swallow6" takes a first ranking.

Figure 6A:
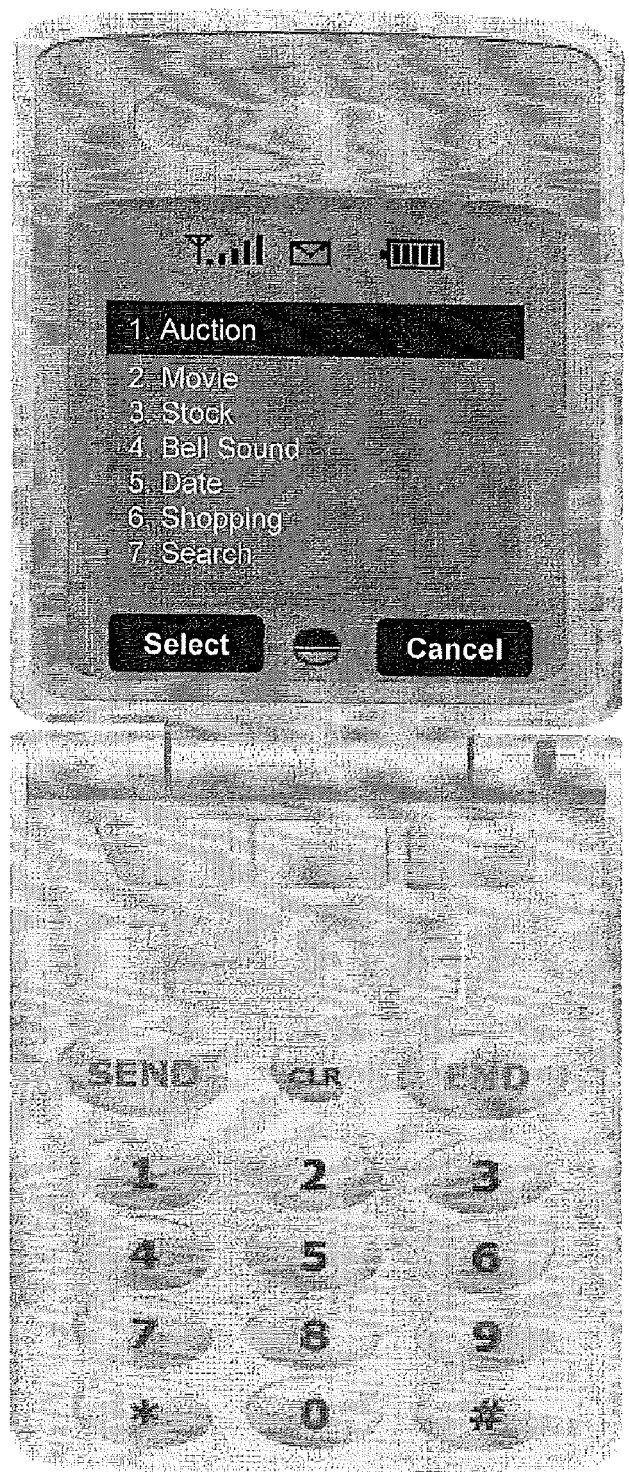
FIGS. 6a to 6c are views of auction screens provided through a wireless terminal.
Figure 6B:
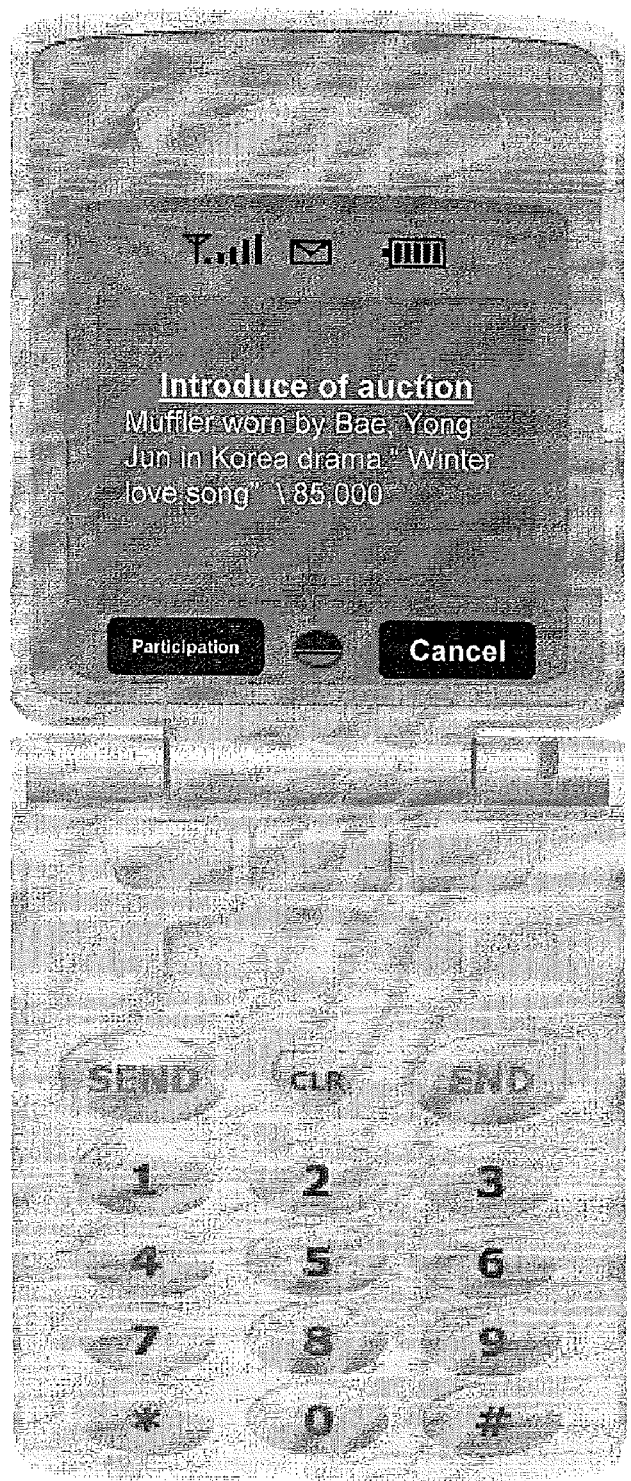
Figure 6C:
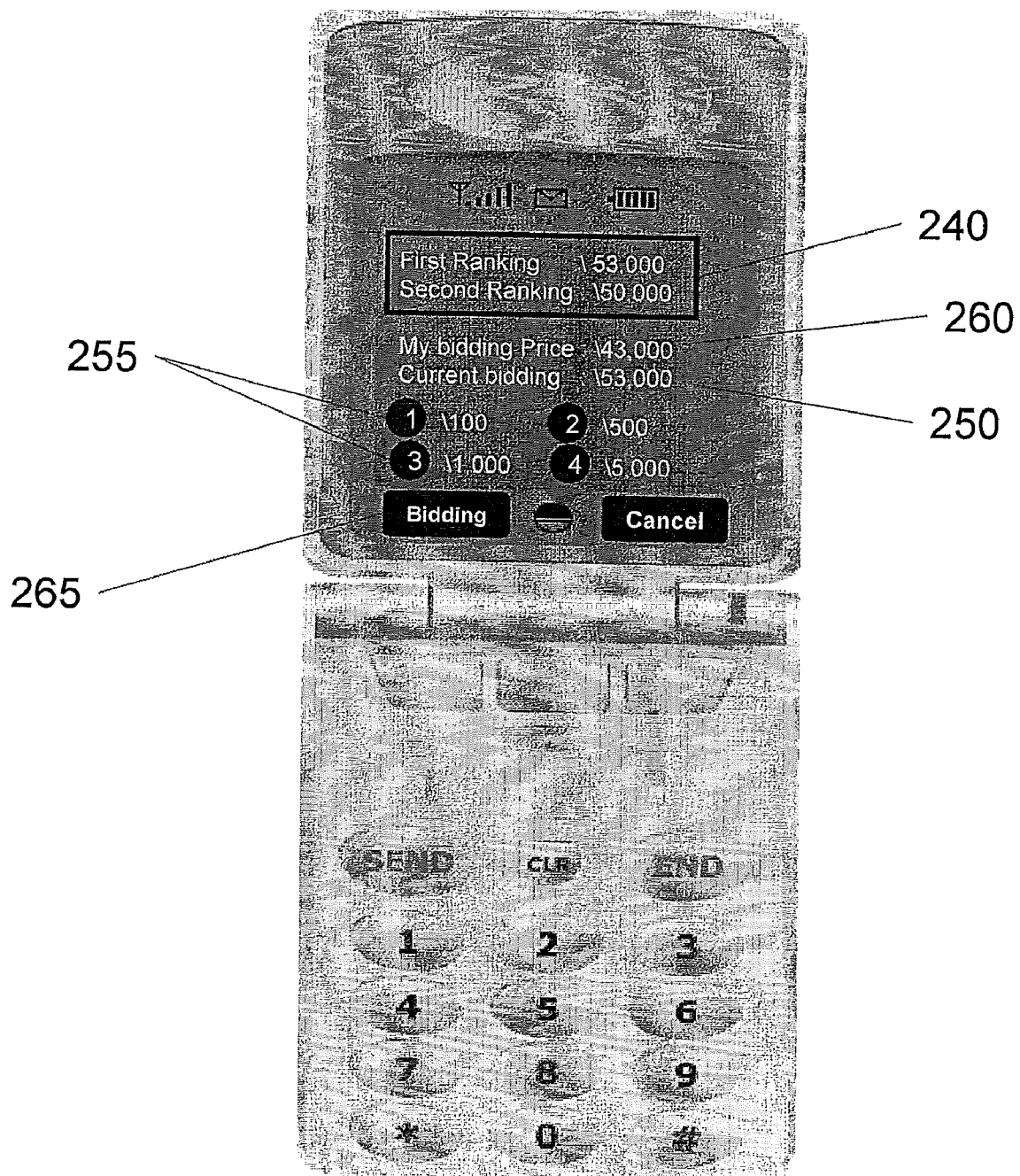

Meanwhile, in the case of the use of the wireless terminal 55, when the wireless terminal 55 accesses the wireless Internet as shown in FIGS. 6a to 6c, a menu including an auction item is displayed as shown in FIG. 6a. When the auction item is selected, an auction product introduction screen appears to display auction information, as shown in FIG. 6b. When the participation button is selected to allow the user to participate in the auction, the auction screen appears to display particulars of biddings, as shown in FIG. 6c. The auction screen is provided with a ranking window 240 on which the rankings and bidding prices of bidders are displayed, a plurality of price buttons 255 that used to select bidding prices, a current bidding price 250 that is displayed in response to the selection of a bidding price, and a my bidding price 260 that is a previous bidding price of the present bidder if he has made a bid. When a desired bidding price is displayed by selecting a bidding price using the buttons of the wireless terminal 55, the bidder completes betting by selecting the batting button 265.

In the meantime, if a predetermined bidding time has elapsed at step S30, a highest bidding price is determined for a candidate successful bidding price. In this case, the payment module 31 determines whether the candidate successful bidding price is equal to or higher than a predetermined desired successful bidding price at step S32. If the candidate successful bidding price is lower than the predetermined desired successful bidding price as the result of the determination, the predetermined auction time is extended at step S40. If the candidate successful bidding price is equal to or higher than the predetermined desired successful bidding price as the result of the determination, the payment module 31 calculates a difference between a highest bidding price and a next highest bidding price at step S34. In this case, if the calculated difference is equal to or greater than a predetermine difference, a successful bid is determined at step S36. If the calculated difference is less than a predetermined difference, the auction time is extended at step S40.

If the auction time is extended, the time when the auction ends and re-bidding starts is delayed, and motion picture advertisements can be provided through the advertisement window 150 during the extended auction time. Of course, motion picture advertisements can be provided during remnant times other than times before an auction and a re-bidding.

Meanwhile, if the auction time is extended, the participation of persons, who can participate in the extended auction, are not restricted, or participation in the extended auction can be restricted to a candidate successful bidder and a next ranking bidder. If the auction is extended and the extended auction time has elapsed, a highest bidding price is determined for a successful bidding price at step S42. When a successful bid is determined, a successful bidder can pay all or part of the successful bidding price with accumulated points that have been generated by the use of the auction site at step S38. In the case where there is no accumulated points, the successful bidding price can be paid for in cash or by a credit card or debit card.

In the meantime, although in the above-described embodiment the auction time is extended one time, the auction time can be extended two or more times. If a highest bidding price is lower than the desired bidding price, bidding can be invalidated.

As described above, in accordance with the present invention, auction information is provided to the public through terrestrial broadcasting, thus increasing the number of bidders participating in an auction by promoting participation in the auction, and allowing the process of the auction to be rapidly performed. Accordingly, an auction is activated, and auction information is provided to the public in a push manner, thus providing convenience to participants of the auction. Further, the auction screen 100 is constructed in a graphic form, so the interest of participants can be increased in the auction and continuous participation in the auction can be promoted. Further, motion picture advertisements are displayed through the advertisement window 150 formed in the auction screen 100 for remnant time, so the effect of advertisements can be increased and the tedium of participants can be eliminated.

Meanwhile, if a difference between a candidate successful bidding price and a next ranking bidding price is less than a certain value, the auction time is extended, so one more opportunity can be provided to persons having lost bidding chances and a next ranking bidder having lost a chance to make a successful bid. In consequence, participants can have chances to purchase a desired product while a vendor can sell the product at a higher bidding price, so the participants and the vendor can all be satisfied.

Although the present invention has been described through the embodiments, the present invention is not limited to these embodiments.

Bidding rankings can be provided through one or more of terrestrial broadcasting, an Internet site, and wired and wireless terminals, and through an Automatic Response System (ARS) in a voice form. That is, auction information is not only provided through terrestrial broadcasting, but bidding rankings are also provided in a certain space. Alternatively, the same auction information as broadcast through the terrestrial broadcasting is not only displayed in real time on an Internet page connected to networks, but bidding rankings are also displayed in part of an Internet page. Further, auction information including bidding rankings can be provided through wired and wireless terminals that can perform duplex communications, for example, a wireless Internet phone. Further, persons can be provided with auction information including bidding rankings by accessing the ARS, in which the auction information is updated in real time, through wired and wireless terminals, for example, telephones.

In addition, selling prices, at which products to be auctioned are sold at shopping malls or off-line, can be provided through one or more of terrestrial broadcasting, an Internet site, and wired and wireless terminals, or through an Automatic Response System (ARS) in a voice form. For example, the relative price of products to be auctioned is provided through terrestrial broadcasting in conjunction with a price comparison site, so information about comparison of bidding prices with selling prices can be provided. Of course, a related price comparison site can be constructed and information for price comparison can be provided.

Those skilled in the art will appreciate that various modifications, additions and substitutions are possible. Accordingly, the above-described embodiments are only examples of the present invention, and the present invention is not limited to these embodiments.

INDUSTRIAL APPLICABILITY

With the construction of the present invention described above, an auction is publicized through terrestrial broadcasting, so the number of participants of the auction can be increased and the process of the auction can be effectively performed. Further, an auction screen is constructed in a graphic form, bidding rankings are displayed in real time, and additional services, such as advertisement and chatting services, are provided, so the interest of the participants can be increased in the auction, thus promoting the continuous participation in the auction.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An auction method displaying bidding rankings in real time comprising:

selecting an auction server for performing an auction between participants wired or wirelessly connected to an auction server;

connecting participants to the auction server, each participant uses a terminal with a display that presents auction information from said auction server;

transmitting bid prices from participants to said auction server;

displaying the bidding prices on the said display in ranking order of their price;

extending the bidding time if a highest bidding price is lower than a predetermined desired bidding price or a difference between a highest bidding price and a next highest bidding price is less than a predetermined difference when a first set bidding time ends, and allowing only bidders presenting the highest bidding price and the next highest bidding price to participate in the extended auction; and, determining a successful bidding price and a successful bidder when a finally set bidding time ends.

* * * * *